Patented Nov. 2, 1948

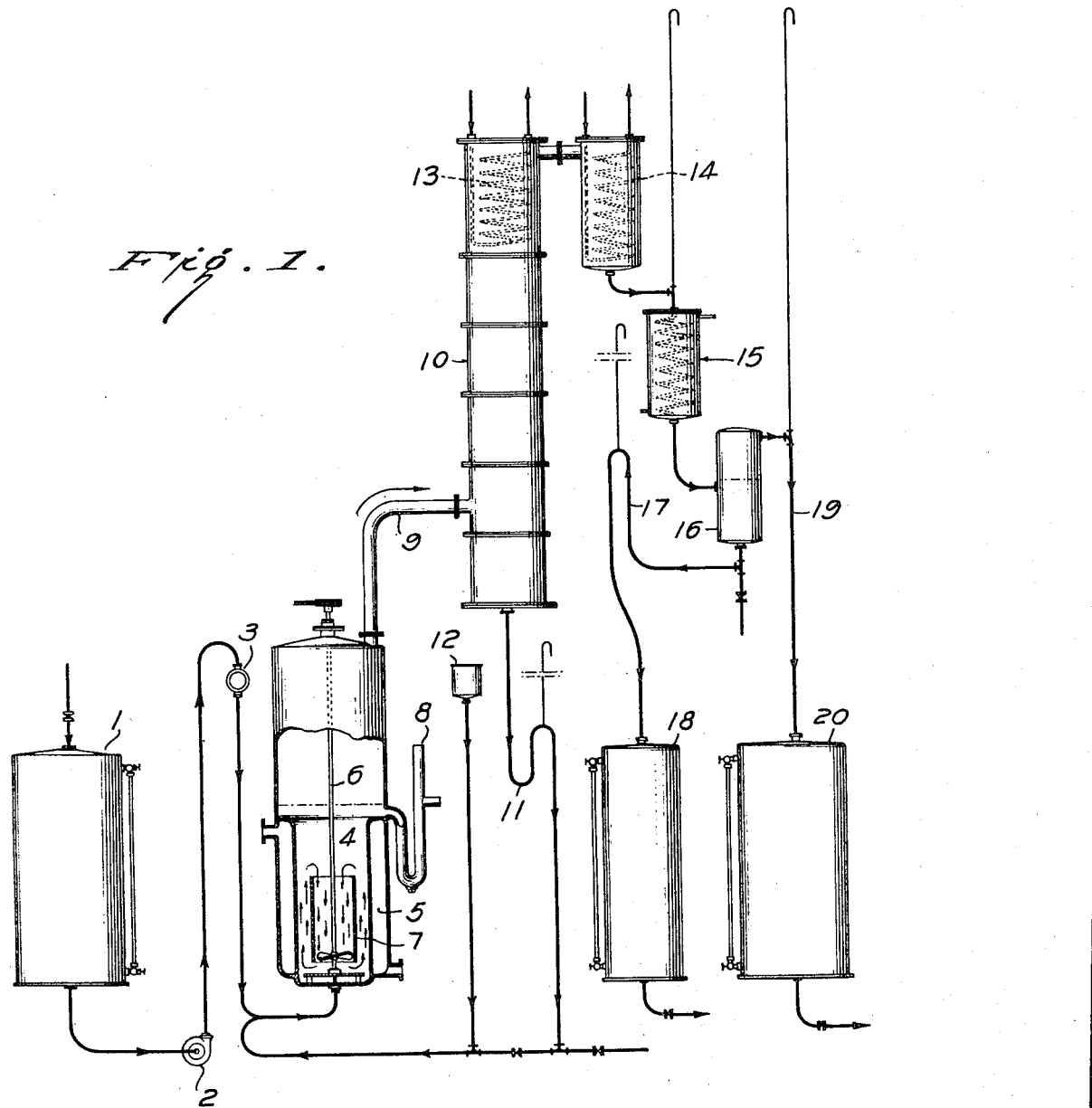

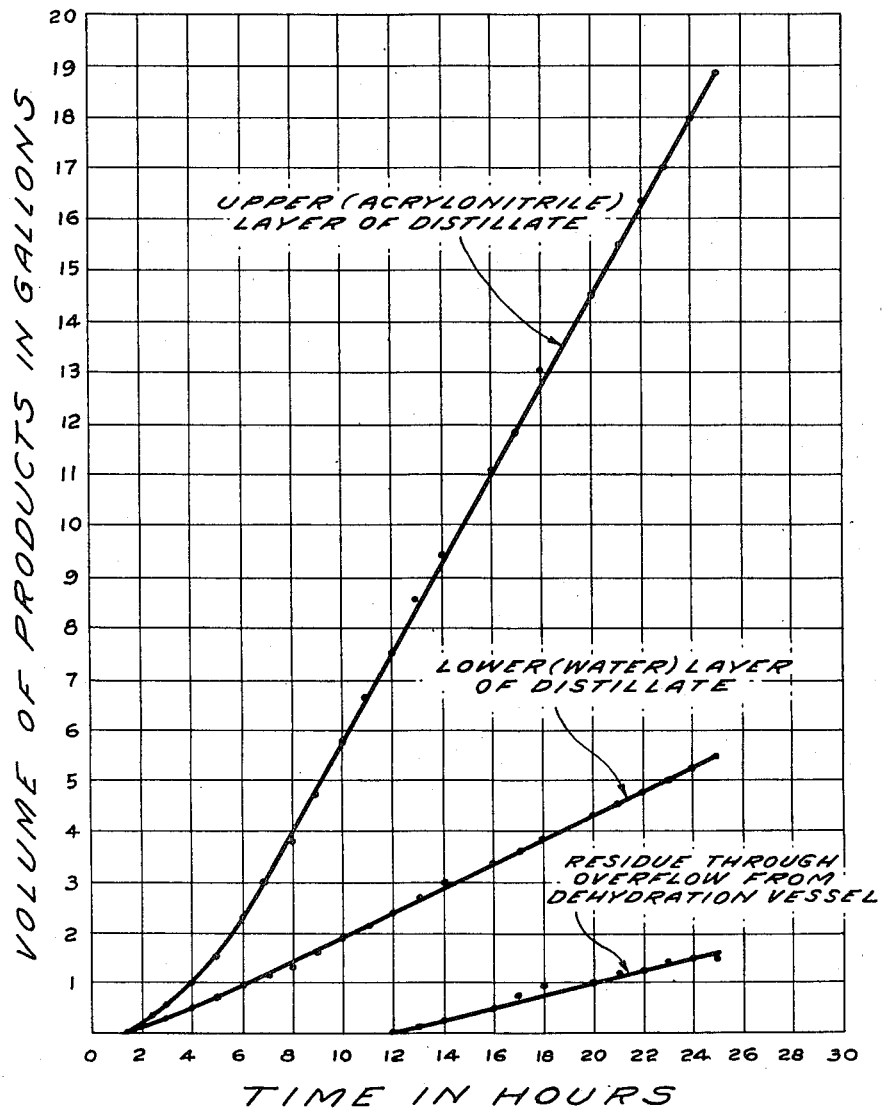

2,452,554

UNITED STATES PATENT OFFICE 2,452,554

PRODUCTION OF ACRYLONITRILE

Harold S. Davis, Riverside, and Erwin L. Carpenter, Old Greenwich, Conn., assignors to American Cyanamid Company, New York, N. Y., a corporation of Maine Application June 6, 1942, Serial No. 446,068

7 Claims. (Cl. 260—465.9)

The present invention relates to the production of a stable acrylonitrile, and more particularly to a method for the continuous production thereof from ethylene cyanohydrin.

This application is a continuation-in-part of an application of Davis and Carpenter, filed September 19, 1939, Serial Number 295,618, now abandoned. As disclosed in that application, acrylonitrile may be readily obtained by heating ethylene cyanohydrin in the presence of a sufficient amount of a catalyst comprising an inorganic compound having an alkaline reaction, such as, for example, calcium oxide, calcium hydroxide, magnesium oxide, sodium carbonate, potassium carbonate, sodium borate or trisodium phosphate. A preferred method of carrying out the invention was disclosed to involve introducing ethylene cyanohydrin into a distilling column containing the catalyst supported on an inert material such as chips of porcelain, pumice, brick or the like, the column being heated to a temperature sufficient to promote optimum dehydration of the ethylene cyanohydrin. A high boiling residue formed during the operation. Particular care was taken to remove the residue from the reaction zone in order to prevent it from depositing on the catalyst and rendering the latter inactive.

It is an object of this invention to provide a method for the continuous production of acrylonitrile from ethylene cyanohydrin. Another object is to avoid the use of the catalyst mentioned in the above process. A further object is to produce acrylonitrile which does not deteriorate under the influence of storage and shipping conditions. Other objects will appear hereinafter.

We have found that the above objects may be accomplished by heating the ethylene cyanohydrin in the presence of a sufficient amount of the residue resulting from the heat treatment of the ethylene cyanohydrin disclosed in the above identified copending application. Under these conditions dehydration of the ethylene cyanohydrin takes place readily as may be expressed by the following overall equation:

$$CH_2OH.CH_2CN \rightarrow CH_2=CHCN + H_2O$$

The dehydration operation may be conveniently carried out at temperatures varying over a wide range, for example, between 140° C. and 240° C. However, operating at a temperature above 240° C. the tendency to coke formation becomes serious, while at temperatures below 140° C. the rate of acrylonitrile production is uneconomical. A preferred temperature for the reaction is within the range of 190° C. to 230° C.

The quality of the ethylene cyanohydrin employed is relatively unimportant. For instance, crude ethylene cyanohydrin usually contains a sufficient quantity of the residue to immediately produce the reaction. It is necessary that a high grade ethylene cyanohydrin be given an initial heating of from 1 to 2 hours in order to form a sufficient quantity of the residue to effect dehydration. By the word "residue" as used in the claims is meant the residue here described.

The residue remaining after dehydration of ethylene cyanohydrin is a hard brown solid with a rosin-like fracture. It is not truly crystalline but is probably a supercooled liquid. It begins to soften when heated to about 80° C., and is a viscous black liquid at 230° C. In the cold it has no odor, but when heated it gives a characteristic amine or amide-like odor. It is extremely hygroscopic and completely soluble in water, moderately soluble in ethyl alcohol, sparingly soluble in acetone, and substantially insoluble in solvents such as benzene, ether, chloroform and carbon tetrachloride. Analyses of representative samples give 49.32% carbon, 6.27% hydrogen and 14.90% nitrogen.

Fig. 1 of the accompanying drawings shows a diagrammatic view of an apparatus suitable for the production of acrylonitrile in accordance with our invention, while Fig. 2 shows the volume of products obtained per hour during a typical run.

Operation may, for example, be accomplished in the apparatus of Fig. 1 which is suitable for continuous operation, by introducing a charge of ethylene cyanohydrin and the residue but predominantly ethylene cyanohydrin into the reaction vessel 4 provided with a heating jacket 5, and a stirrer 6 and draft tube 7 for keeping the charge thoroughly agitated. The charge is then heated by means of jacket 5, preferably at a temperature between 190° C. and 230° C., and held at substantially the same temperature during the run. Ethylene cyanohydrin is fed from storage tank 1 by means of pump 2 through sight glass 3 to the vessel 4 at a rate sufficient to maintain the level of the charge just above the overflow trap 8. Any liquid which passes through the trap 8 is collected and may be either returned to the reaction vessel 4 through receiver 12 or utilized as the initial charge in a subsequent run. As the operation proceeds and more of the residue forms in vessel 4, the charge becomes predominately residue and the overflow from 8 is withheld from the system. The emerging vapors of acrylonitrile, water and unreacted ethylene cyanohydrin pass from the reaction zone through line 9 into the fractionating tower 10. The head of tower 10 is maintained at 80°–100° C. by cooling water passing through condenser 13 so that acrylonitrile and water vapors pass on to condenser 14 while the ethylene cyanohydrin vapors condense and return to the reaction vessel 4 through line 11. The condensate of acrylonitrile and water resulting from the cooling action of condenser 14 passes through the cooling vessel 15 and on to vessel 16. The condenser 14 and cooling vessel 15 are kept cool by circulating water or cold brine solution. The condensate in vessel 16 stratifies into two layers, the lower or water layer passing through line 17 to receiving vessel 18 while the upper or acrylonitrile layer passes through line 19 to receiving vessel 20. The acrylonitrile is withdrawn from vessel 20 and may be refined, as for example, by fractional distillation. A small amount of acrylonitrile remaining in the water layer may be recovered by suitable means such as immediate neutralization by acid and rectification.

This invention is illustrated more fully by the following examples.

*Example 1*

25 gallons of vacuum distilled ethylene cyanohydrin were placed in storage tank 1 of the apparatus described above. Then one gallon was transferred to the vessel 4 by means of pump 2. This quantity was sufficient to fill the reaction vessel 4 to a level just above the overflow trap 8. In order to initially form the residue, heat was supplied by the heating jacket 5 until the contents of the reaction vessel 4 reached a temperature of about 220° C., and the ethylene cyanohydrin vapors were passing freely into the tower 10. The head of the fractionating tower 10 was maintained at 80°–100° C. by condenser 13 so that the ethylene cyanohydrin condensed and returned as liquid to the reaction vessel 4 through the line 11. Any liquid passing through the overflow trap 8 was collected and returned to the vessel 4 through the receiver 12. These were the conditions at the beginning, 0 hours, in the time log of the run as shown in Fig. 2.

Operating under these conditions no distillate of acrylonitrile and water was formed for a period of about 1.5 hours. After the first appearance of the distillate in vessel 16 the rate of production of the acrylonitrile gradually increased up to about the sixth hour and then remained substantially constant during the remainder of the run. Up to and including the twelfth hour of the run all liquid overflowing at trap 8 was returned to the reaction vessel 4 through receiver 12. The ethylene cyanohydrin was continually fed from tank 1 to the reaction vessel 4 at a rate sufficient to keep the level of the charge above the overflow 8. The charge was thoroughly agitated and held at a temperature between 220° and 230° C.

During the course of the run the reaction mixture in vessel 4 darkened and became more viscous, and its content of residue gradually increased. At the sixth hour of the run the ethylene cyanohydrin content of the charge had fallen to about 70%; at the end of the twelfth hour the charge was substantially all residue, with only a low content of ethylene cyanohydrin. From the twelfth hour on, the overflow from 8 was not returned to the reaction vessel but was collected separately, because it was predominately residue containing only small quantities of ethylene cyanohydrin.

At the end of twenty-five hours of operation the ethylene cyanohydrin feed was discontinued and all materials were withdrawn from the apparatus and measured. The dehydration vessel was found to be free from coke and in good operating condition.

The total feed of ethylene cyanohydrin was 210 lbs.; the upper layer of distillate was 131.6 lbs.; the lower layer of distillate was 49.5 lbs.; the residue was 24 lbs. The upper layer of distillate was refined to a product within the commercial specifications for acrylonitrile in quantity corresponding to a yield of 82% of theory based on the ethylene cyanohydrin utilized.

The refined product is a clear liquid, having the following properties:

Distillation range, 76.0° C.–79.0° C.,
Specific gravity, 25° C./25° C., 0.8025,
Acidity, less than 0.02% expressed as acetic acid,
Aldehyde, less than 0.01% expressed as acetaldehyde,
No hydrocyanic acid.

This product after being stored in glass and iron containers for periods of from six to ten months showed no change in the properties listed above.

*Example 2*

The reaction vessel 4 was charged with a quantity of residue from the run of Example 1 sufficient to maintain the level above the overflow trap 8. This charge was heated to about 230° C. Continuous dehydration was carried out on a feed of 22 gallons of vacuum distilled ethylene cyanohydrin according to the procedure described above. The per cent yield of acrylonitrile based on the ethylene cyanohydrin consumed was approximately the same as obtained in Example 1.

*Example 3*

112 pounds of crude ethylene cyanohydrin prepared from ethylene oxide and hydrocyanic acid according to the method described in U. S. application, Serial Number 256,676, filed February 16, 1939, was dehydrated in the apparatus shown in Fig. 1 substantially according to the procedure of Example 1. This particular sample of crude ethylene cyanohydrin contained about 12.8% of residue. The yield of acrylonitrile from the upper layer of distillate was 80% of theory.

In the past, olefinic nitriles have been looked upon as relatively unstable compounds. Acrylonitrile, for example, has been known to deteriorate and change largely into a solid in a few days and even in a few hours. Properties of this compound, such as acidity and color, have been known to change under normal storage conditions which may be detrimental to its value as a commodity. This potential instability of acrylonitrile during storage has been without doubt one of the major obstacles met in the development of its manufacture to the scale where it could be shipped, for example, in drums or tank cars.

We have found that the refined acrylonitrile prepared either in accordance with the present invention or by the method of our above mentioned copending application is a stable product, and that it can be stored for extended periods in iron tanks and drums without developing traces of hydrocyanic acid or otherwise deteriorating. It remains stable when shipped in tank cars, and can be used without further processing in many industries, for example, in the manufacture of artificial rubber.

While the invention has been described with particular reference to specific embodiments, it is to be understood that it is not to be limited thereto but is to be construed broadly and restricted solely by the scope of the appended claims.

We claim:

1. The method of producing acrylonitrile which consists of heating ethylene cyanohydrin in the presence of a sufficient amount of a residue resulting from the heat treatment of the ethylene cyanohydrin so as to cause dehydration of the ethylene cyanohydrin.

2. The method of claim 1 in which the heat treatment is from 140° C. to 240° C.

3. The method of claim 1 wherein the dehydration is carried out at a temperature within the range of 140° C. and 240° C.

4. The method of producing acrylonitrile which consists of the steps of continuously introducing ethylene cyanohydrin into a charge of residue resulting from the heat treatment of the ethylene cyanohydrin heated at a temperature within the range of 140° C. to 240° C., continuously removing the vaporous products and recovering the acrylonitrile therefrom.

5. The method of claim 4 which includes the step of continuously removing residue from the charge.

6. In the method for the production of acrylonitrile the steps which consist of continuously introducing ethylene cyanohydrin into a charge of residue resulting from the heat treatment of the ethylene cyanohydrin heated at a temperature of from 190° C. to 230° C., continuously removing vapors of acrylonitrile, water and ethylene cyanohydrin, separating the ethylene cyanohydrin from the acrylonitrile and water vapors, returning the ethylene cyanohydrin to the charge, condensing the vapors of acrylonitrile and water, permitting the condensate of acrylonitrile and water to stratify into two layers, continuously removing the lower or water layer and the upper or acrylonitrile layer, and recovering the acrylonitrile.

7. The method of claim 6 which includes the step of continuously removing residue from the charge.

HAROLD S. DAVIS.
ERWIN L. CARPENTER.

REFERENCES CITED

The following references are of record in the file of this patent:

UNITED STATES PATENTS

| Number | Name | Date |
|---|---|---|
| 2,097,155 | Groll et al. | Oct. 26, 1937 |
| 2,263,436 | Britton et al. | Nov. 18, 1941 |

FOREIGN PATENTS

| Number | Country | Date |
|---|---|---|
| 496,372 | Germany | Apr. 24, 1930 |